US012698298B2

(12) United States Patent
Saga

(10) Patent No.: US 12,698,298 B2
(45) Date of Patent: Aug. 4, 2026

(54) METHOD OF PURIFYING PHOSPHORUS COMPOUND AND METHOD OF REUSING THE SAME

(71) Applicant: MARUZEN PETROCHEMICAL CO., LTD., Tokyo (JP)

(72) Inventor: Yuta Saga, Ichihara (JP)

(73) Assignee: Maruzen Petrochemical Co., LTD., Tokyo (JP)

(*) Notice: Subject to any disclaimer, the term of this patent is extended or adjusted under 35 U.S.C. 154(b) by 536 days.

(21) Appl. No.: 18/257,910

(22) PCT Filed: Feb. 8, 2022

(86) PCT No.: PCT/JP2022/004801
§ 371 (c)(1),
(2) Date: Jun. 16, 2023

(87) PCT Pub. No.: WO2022/172906
PCT Pub. Date: Aug. 18, 2022

(65) Prior Publication Data

US 2024/0058723 A1 Feb. 22, 2024

(30) Foreign Application Priority Data

Feb. 9, 2021 (JP) ................................ 2021-019311

(51) Int. Cl.
*C07F 9/142* (2006.01)
*B01D 3/34* (2006.01)
*C07F 9/40* (2006.01)

(52) U.S. Cl.
CPC ................ *C07F 9/142* (2013.01); *B01D 3/34* (2013.01); *C07F 9/4006* (2013.01); *C07F 9/4015* (2013.01)

(58) Field of Classification Search
CPC ............................................ C07F 9/025-4009
See application file for complete search history.

(56) References Cited

U.S. PATENT DOCUMENTS

| | | | |
|---|---|---|---|
| 3,681,481 | A | 8/1972 | Lin |
| 10,479,809 | B2 | 11/2019 | Kinami et al. |
| 2011/0213061 | A1 | 9/2011 | Hill et al. |

FOREIGN PATENT DOCUMENTS

| | | | |
|---|---|---|---|
| CN | 102177165 | A | 9/2011 |
| JP | 2003-055333 | A | 2/2003 |
| WO | 2009/051025 | A1 | 4/2009 |
| WO | 2017/043552 | A1 | 3/2017 |

OTHER PUBLICATIONS

Japanese Office Action (Application No. 2022-580627) dated Jul. 18, 2025 (with English translation) (7 pages).
Japanese Office Action (with English translation) dated Mar. 28, 2025 (Application No. 2022-580627).
Li-Biao Han et al., "Efficient and Selective Nickel-Catalyzed Addition of H—P(O) and H—S Bonds to Alkynes," *Journal of American Chemical Society,* 2004, vol. 126, pp. 5080-5081 (2 pages).
International Search Report and Written Opinion (Application No. PCT/JP2022/004801) dated Apr. 19, 2022.
Extended European Search Report dated Jan. 17, 2025 (Application No. 22752729.8).
Chinese Office Action (with English translation) dated May 23, 2025 (Application No. 202280006337.6).
English translation of the International Preliminary Report on Patentability (Chapter I) dated Aug. 24, 2023 (Application No. PCT/JP2022/004801).
Chinese Office Action (with English translation) dated Jan. 21, 2026 (Application No. 202280006337.6).

*Primary Examiner* — Medhanit W Bahta
(74) *Attorney, Agent, or Firm* — Muncy, Geissler, Olds & Lowe, P.C.

(57) ABSTRACT

[Problem to be Solved] An object of the present invention is to provide a method of purifying a phosphorus compound, which method is capable of reducing the generation of a by-product during distillation.
[Solution to Problem] The method of method of purifying a phosphorus compound according to the present invention includes the steps of: obtaining a mixture containing a specific phosphorus compound, a specific alkenyl phosphorus compound and a transition metal complex; and subjecting the resulting mixture to distillation after adding a Lewis acid to the mixture, to obtain a first distillate containing the specific phosphorus compound.

10 Claims, No Drawings

METHOD OF PURIFYING PHOSPHORUS COMPOUND AND METHOD OF REUSING THE SAME

BACKGROUND OF THE INVENTION

Field of the Invention

The present invention relates to a method of purifying a phosphorus compound. More particularly, the present invention relates to a method of purifying a phosphorus compound by distillation. The present invention also relates to a method of reusing the purified phosphorus compound, as a raw material substance for the synthesis of an alkenyl phosphorus compound.

Background Art

Organic phosphorus compounds are chemical substances widely used in a variety of products, such as flame retardants, plasticizers, insecticides, pharmaceutical and agricultural chemicals, ligands for metal complexes and the like. In recent years, organic phosphorus compounds are particularly attracting industrial attention as functional materials, also in the fields of constituent materials for metal surface treatment agents, flame retardant resins and the like, and electronic materials.

Since phosphonic acid derivatives, among organic phosphorus compounds, are useful precursor substances of a variety of chemical substances described above, various production methods thereof have been conventionally investigated. For example, the production of a phosphonic acid derivative by the addition reaction (hereinafter, referred to as "hydrophosphorylation reaction") of the P(O)—H bond of phosphonic acid to an alkyne, using a catalyst, has been performed. For example, Patent Document 1 proposes a technique of producing a phosphonic acid derivative in which a phosphonic acid diester compound that has been partially hydrolyzed in advance, is used as a raw material. Further, Non-patent Document 1 proposes a technique of producing a phosphonic acid derivative using any of various zero-valent nickel catalysts.

CITATION LIST

Patent Document

Patent Document 1: WO 2017/043552

Non-patent Document

Non-patent Document 1: J. AM. CHEM. SOC. 2004, 126, 5080 to 5081

SUMMARY OF THE INVENTION

Technical Problem

In the reaction conditions disclosed in Patent Document 1, however, a mixture containing a raw material phosphorus compound and a product obtained after the hydrophosphorylation reaction is subjected to distillation under reduced pressure, at the time of performing distillation purification, to obtain the raw material phosphorus compound and an alkenyl phosphorus compound. The raw material phosphorus compound obtained at this time can be used again, as a raw material substance for the synthesis of the alkenyl phosphorus compound, to achieve a reduction in the cost of raw materials. However, a new problem has been found out that a side reaction of the raw material phosphorus compound occurs during the distillation purification to generate a by-product that acts as a catalyst poison. In cases where the phosphorus compound containing the thus generated by-product is reused as a raw material substance for the synthesis of the alkenyl phosphorus compound, the yield of the alkenyl phosphorus compound is significantly reduced, and thus, the by-product needs to be removed by purification. This results in a necessity to perform an additional purification process, leading to an increase in the production cost.

Solution to Problem

As a result of intensive studies to solve the above-mentioned problems, the present inventors have found out that the addition of a Lewis acid to a mixture containing a specific phosphorus compound, a specific alkenyl phosphorus compound and a transition metal complex to distillation enables to reduce the generation of a by-product that acts as a catalyst poison, when subjecting the mixture to distillation, thereby completing the present invention.

Specifically, the present invention provides the following inventions.

[1] A method of purifying a phosphorus compound, comprising the steps of:

obtaining a mixture of a phosphorus compound represented by the following general formula (1):

(1)

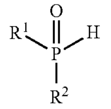

(wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure), an alkenyl phosphorus compound represented by the following general formula (2):

(2)

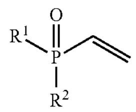

(wherein, in general formula (2), the definitions of $R^1$ and $R^2$ are the same as those of $R^1$ and $R^2$ in the general formula (1)) and a transition metal complex; and subjecting the mixture to distillation after adding a Lewis acid to the mixture, to obtain a first distillate containing the phosphorus compound represented by the general formula (1).

[2] The purification method according to [1], wherein the content of a compound represented by the following general formula (3):

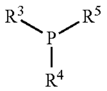

(wherein, in general formula (3), the definitions of $R^3$ and $R^4$ are the same as those of $R^1$ and $R^2$ in the general formula (1); and $R^5$ represents a substituted or unsubstituted alkoxy group, a substituted or unsubstituted aryloxy group, or a substituted or unsubstituted allyl group) in the first distillate is 0.1% by mass or less with respect to the total mass of the first distillate.

[3] The purification method according to [1] or [2], wherein the Lewis acid is a metal compound and/or a boron compound.

[4] The purification method according to [3], wherein the metal compound is at least one selected from the group consisting of a zinc compound, an iron compound and an aluminum compound.

[5] The purification method according to [4], wherein the zinc compound is zinc chloride. [6] The purification method according to any one of [1] to [5], wherein each of $R^1$ and $R^2$ in the general formulae (1) and (2) independently represents a substituted or unsubstituted alkoxy group having from 1 to 10 carbon atoms, or a substituted or unsubstituted aryl group.

[7] The purification method according to any one of [1] to [6], wherein, in the general formula (3), each of $R^3$, $R^4$ and $R^5$ independently represents a substituted or unsubstituted alkoxy group having from 1 to 10 carbon atoms, a substituted or unsubstituted aryloxy group, or a substituted or unsubstituted allyl group.

[8] The purification method according to any one of [1] to [7], wherein the compound represented by the general formula (1) is dimethyl phosphite.

[9] The purification method according to any one of [1] to [8], wherein the compound represented by the general formula (2) is dimethyl vinyl phosphonate.

[10] The purification method according to [2], wherein the compound represented by the general formula (3) is trimethyl phosphite.

[11] A reuse method, including using the phosphorus compound represented by the general formula (1) obtained by the purification method according to any one of [1] to [10], as a raw material substance for the synthesis of the alkenyl phosphorus compound represented by the general formula (2).

Advantageous Effects of Invention

According to the present invention, it is possible to recover a specific phosphorus compound that serves as a raw material substance for the synthesis of a specific alkynyl compound while reducing the generation of a by-product that acts as a catalyst poison, by subjecting a mixture containing the specific phosphorus compound, a specific alkenyl phosphorus compound and a transition metal complex to distillation purification. Further, according to the present invention, the recovered specific phosphorus compound can be reused as a raw material substance for the synthesis of the specific alkenyl phosphorus compound.

DETAILED DESCRIPTION OF THE INVENTION

[Method of Purifying Phosphorus Compound]

In the method of purifying a phosphorus compound according to the present invention, a mixture containing a specific phosphorus compound, a specific alkenyl phosphorus compound and a transition metal complex is obtained, first. The step of obtaining a mixture is preferably a step in which a specific alkenyl phosphorus compound is synthesized by the hydrophosphorylation reaction of a specific phosphorus compound and acetylene, in the presence of a transition metal complex as a catalyst, to obtain the above-described mixture.

Subsequently, the resulting mixture is subjected to distillation after adding a Lewis acid to the mixture, to obtain a first distillate containing the phosphorus compound. Upon distillation of the mixture, a second distillate mainly containing the phosphorus compound and the alkenyl phosphorus compound, and a third distillate mainly containing the alkenyl phosphorus compound can further be obtained. The addition of a Lewis acid to the mixture enables to inhibit the dehydration condensation reaction of the phosphorus compound during the distillation, and to reduce the generation of a by-product that acts as a catalyst poison. The phosphorus compound recovered from the first distillate can be reused as a raw material substance for the synthesis of the alkenyl phosphorus compound.

The content of the phosphorus compound in the first distillate is preferably 80% by mass or more, more preferably 90% by mass or more, still more preferably 95% by mass or more, and yet still more preferably 98% by mass or more, with respect to the total amount of the first distillate. The content of the by-product in the first distillate is preferably 0.1% by mass or less and more preferably 0.01% by mass or less, and it is still more preferred that no by-product be substantially contained. The mass ratio of the content of the phosphorus compound and the content of the alkenyl phosphorus compound in the second distillate is not particularly limited. However, for example, it is preferred that the content of the raw material phosphorus compound be less than 80% by mass and the content of the alkenyl phosphorus compound be 20% by mass or more, it is more preferred that the content of the raw material phosphorus compound be less than 50% by mass and the content of the alkenyl phosphorus compound be 50% by mass or more, and it is still more preferred that the content of the raw material phosphorus compound be less than 20% by mass and the content of the alkenyl phosphorus compound content be 80% by mass or more, with respect to the total amount of the raw material phosphorus compound and the alkenyl phosphorus compound. Further, the content of the alkenyl phosphorus compound in the third distillate is preferably 90% by mass or more, more preferably 95% by mass or more, and still more preferably 98% by mass or more, with respect to the total amount of the third distillate.

The second distillate obtained above can be subjected to re-distillation to obtain a fourth distillate mainly containing the phosphorus compound, a fifth distillate mainly containing the phosphorus compound and the alkenyl phosphorus compound, and a sixth distillate mainly containing the alkenyl phosphorus compound. The phosphorus compound recovered from the fourth distillate can be reused as a raw material substance for the synthesis of the alkenyl phosphorus compound. The content of the phosphorus compound in the fourth distillate is preferably 80% by mass or more, more preferably 90% by mass or more, still more preferably 95% by mass or more, and yet still more preferably 98% by mass or more, with respect to the total amount the fourth distillate. The content of the by-product in the fourth distillate is preferably 0.1% by mass or less and more preferably 0.01% by mass or less, and it is still more preferred that no by-product be substantially contained. The mass ratio of the content of the phosphorus compound and the content of the alkenyl phosphorus compound in the fifth distillate is not particularly limited. However, for example, it is preferred that the content of the raw material phosphorus compound be less than 80% by mass and the content of the alkenyl phosphorus compound be 20% by mass or more, it is more preferred that the content of the raw material phosphorus compound be less than 50% by mass and the content of the alkenyl phosphorus compound be 50% by mass or more, and it is still more preferred that the content of the raw material phosphorus compound be less than 20% by mass and the content of the alkenyl phosphorus compound content be 80% by mass or more, with respect to the total amount of the raw material phosphorus compound and the alkenyl phosphorus compound. The content of the alkenyl phosphorus compound in the sixth distillate is preferably 90% by mass or more, more preferably 95% by mass or more, and still more preferably 98% by mass or more, with respect to the total amount of the sixth distillate. In the present invention, the expression "mainly containing" refers to that the content of the corresponding compound is 80% by mass or more.

The fifth distillate obtained above can be subjected to re-distillation singly or after being mixed with the second distillate obtained above, to recover the phosphorus compound and reuse it as a raw material substance for the synthesis of the alkenyl phosphorus compound.

The conditions for the above-described distillation and re-distillation are not particularly limited, as long as the compound of interest can be obtained by distillation. However, the distillation is preferably carried out, for example, at a distillation temperature of from 40 to 150° C., and more preferably from 60 to 120° C. Further, the distillation is preferably carried out for a distillation time from 1 to 60 hours, and more preferably from 8 to 24 hours. A commercially available distillation equipment which is conventionally known can be used as the apparatus for distillation. The phosphorus compound, the alkenyl phosphorus compound and the Lewis acid will be described below, in specific detail.

(Phosphorus Compound)

The phosphorus compound to be contained in the mixture is represented by the following general formula (1):

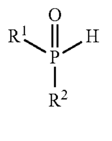

(1)

(wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure).

In the general formula (1), the number of carbon atoms of the alkyl group, the alkoxy group, the cycloalkyl group, the aralkyl group, the aryl group or the aryloxy group represented by each of $R^1$ and $R^2$ is preferably from 1 to 10. The number of carbon atoms described above does not include the number of carbon atoms of a substituent. Examples of the group represented by each of $R^1$ and $R^2$ include: alkyl groups such as methyl group, ethyl group, propyl group, isopropyl group, n-butyl group, isobutyl group, sec-butyl group, pentyl group and hexyl group; alkoxy groups such as methoxy group, ethoxy group and butoxy group; cycloalkyl groups such as cyclohexyl group; aralkyl groups such as benzyl group and phenethyl group; aryl groups such as phenyl group, tolyl group, xylyl group and naphthyl group; and aryloxy groups such as phenoxy group. Among these groups, it is preferred that each of $R^1$ and $R^2$ independently be a substituted or unsubstituted alkoxy group.

The substituent which may be included in each of $R^1$ and $R^2$ in the general formula (1) may be, for example, an alkyl group, a cycloalkyl group, an alkoxy group, a cycloalkoxy group, a heterocyclic group, an alkylidene group, a silyl group, an acyl group, an acyloxy group, a carboxy group, a cyano group, a nitro group, a hydroxy group, a mercapto group and an oxo group. Further, the number of carbon atoms contained in the substituent is preferably from 1 to 6, more preferably from 1 to 4, and still more preferably from 1 to 3.

(Alkenyl Phosphorus Compound)

The alkenyl phosphorus compound to be contained in the mixture is represented by the following general formula (2):

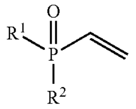

(2)

(wherein, in general formula (2), the definitions of $R^1$ and $R^2$ are the same as those of $R^1$ and $R^2$ in the general formula (1)).

Preferred embodiments of $R^1$ and $R^2$ are as described above.

(Hydrophosphorylation Reaction)

The alkenyl phosphorus compound represented by the general formula (2) can be obtained, for example, by the hydrophosphorylation reaction of the phosphorus compound represented by the general formula (1). Specifically, the alkenyl phosphorus compound can be synthesized by the hydrophosphorylation reaction of the phosphorus compound and acetylene, which are raw material substances, in the presence of a transition metal complex as a catalyst.

The ratio of the amount of substance of the phosphorus compound represented by the general formula (1) and the alkynyl compound represented by the general formula (3), which are the raw material substances for the hydrophosphorylation reaction, is preferably such that the ratio of the amount of substance of the alkynyl compound when the amount of substance of the raw material phosphorus compound is taken as 1, is from 0.01 to 1,000, more preferably from 0.1 to 100, and still more preferably from 1 to 15.

(Transition Metal Complex (Catalyst))

A transition metal complex can be used as the catalyst to be used in the hydrophosphorylation reaction. The transition metal complex may be, for example, a nickel complex, and is preferably a zero-valent nickel complex.

The nickel complex described above is preferably a nickel complex of nickel and a phosphine. The phosphine is preferably a phosphine containing an aliphatic substituent or an aromatic substituent. Examples of the phosphine containing an aliphatic substituent include trimethylphosphine, tributylphosphine and trioctylphosphine. Examples of the phosphine containing an aromatic substituent include triphenylphosphine, 1,2-bis(diphenylphosphino)ethane, 1,3-bis (diphenylphosphino)propane, 1,4-bis(diphenylphosphino) butane, diphenyl methylphosphine, tris(2-methylphenyl) phosphine, tris(3-methylphenyl)phosphine, tris(4-methylphenyl)phosphine and tris(4-methoxyphenyl) phosphine. The phosphine containing an aliphatic substituent is capable of significantly improving the reaction velocity of the raw material phosphorus compound with the alkenyl compound. The phosphine containing an aromatic substituent is inexpensive and can be easily handled in air, and thus is capable of reducing the production cost and improving the production efficiency.

(Reaction Conditions)

The amount of the transition metal complex (catalyst) to be used in the hydrophosphorylation reaction is not particularly limited as long as the reaction proceeds sufficiently. However, the amount of the transition metal complex used is preferably from 0.01 to 10 mol, more preferably from 0.1 to 5.0 mol, and still more preferably from 0.5 to 2.0 mol, with respect to 1 mol of the phosphorus compound as a raw material substance.

The reaction temperature of the hydrophosphorylation reaction is not particularly limited. In view of improving the reaction efficiency and the reaction velocity, and reducing the generation of a by-product, however, the reaction temperature is preferably from −20 to 60° C., more preferably from −15 to 40° C., and still more preferably from −10 to 10° C. When the reaction temperature is within the range described above, it is possible to improve the reaction velocity of the hydrophosphorylation reaction, and to enhance the conversion rate of the raw material phosphorus compound to the alkenyl phosphorus compound.

The reaction time of the hydrophosphorylation reaction is not particularly limited. In view of improving the reaction efficiency and the reaction velocity, and reducing the generation of a by-product, however, the reaction time is preferably from 30 minutes to 1,000 minutes, more preferably from 60 minutes to 900 minutes, and still more preferably from 120 minutes to 800 minutes. When the reaction time is within the range described above, it is possible to allow the hydrophosphorylation reaction to proceed sufficiently, and to enhance the conversion rate of the raw material phosphorus compound to the alkenyl phosphorus compound.

The hydrophosphorylation reaction may be carried out either in an organic solvent or in the absence of a solvent, but is preferably carried out in the absence of a solvent. The hydrophosphorylation reaction can be allowed to proceed, by using the non-solvent method and performing a mild heating. It is possible to omit the solvent removal process after the completion of the reaction and to reduce the production cost, by carrying out the reaction in the absence of a solvent. The organic solvent may be, for example, an aromatic hydrocarbon, a hydrocarbon other than the aromatic hydrocarbon, an alcohol, an ether, a ketone, an ester or the like, but not particularly limited thereto.

The hydrophosphorylation reaction is preferably carried out in an inert gas atmosphere, in view of improving the reaction efficiency and the reaction velocity, and reducing the generation of a by-product. It is preferred that nitrogen, argon or the like be used as the inert gas.

The conversion rate from the phosphorus compound to the alkenyl phosphorus compound in the hydrophosphorylation reaction is preferably 60% or more, more preferably 70% or more, and still more preferably 75% or more, and yet still more preferably 80% or more. The “conversion rate (%)” in the present invention can be determined by calculating the proportion of the raw material phosphorus compound decreased by the end of the reaction with respect to the amount of substance of the raw material phosphorus compound at the start of the reaction. The conversion rate of the reaction as used herein can be measured by identifying the respective components by GC-FID. When the conversion rate from the phosphorus compound to the alkenyl phosphorus compound is equal to or higher than the numerical value described above, it is possible to achieve an efficient raw material utilization, a reduction in the production cost, and an improvement in the production efficiency.

(Lewis Acid)

A metal compound and/or a boron compound can be used as the Lewis acid to be contained in the mixture. The metal compound may be, for example, a zinc compound, an iron compounds, an aluminum compound or the like, and is preferably zinc chloride, zinc bromide, iron (II) chloride or the like, and more preferably zinc chloride. The boron compound may be, for example, borane, a borane-tetrahydrofuran complex, a borane-dimethyl sulfide complex, a borane-diethyl ether complex, trifluoroborane, a trifluoroborane-diethyl ether complex, a trifluoroborane-tetrahydrofuran complex, triphenylborane or the like, and is preferably a borane-tetrahydrofuran complex, a borane-diethyl ether complex, trifluoroborane or the like. These Lewis acids may be used singly, or in combination of two or more types kinds thereof. It is possible to inhibit the decomposition of the phosphorus compound represented by the general formula (1) and to reduce the generation of a by-product, by subjecting the mixture to distillation after adding the Lewis acid to the mixture.

(By-Product)

There is a risk that a compound represented by the following general formula (3) is generated as a by-product during the distillation of the mixture.

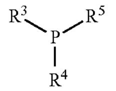

(In general formula (3), the definitions of $R^3$ and $R^4$ are the same as those of $R^1$ and $R^2$ in the general formula (1); and $R^5$ represents a substituted or unsubstituted alkoxy group, a substituted or unsubstituted aryloxy group, or a substituted or unsubstituted allyl group.)

Preferred embodiments of $R^3$ and $R^4$ are the same as the preferred embodiments of $R^1$ and $R^2$ described above.

In the general formula (3), the number of carbon atoms of the alkoxy group or the aryloxy group represented by $R^5$ is preferably from 1 to 10. The number of carbon atoms described above does not include the number of carbon atoms of a substituent. Examples of the group represented by each of $R^3$ and $R^4$ include: alkoxy groups such as methoxy group, ethoxy group and butoxy group; and aryloxy groups such as phenoxy group. Among these groups, it is preferred that each of $R^3$ and $R^4$ independently be a substituted or unsubstituted alkoxy group.

The substituent which may be included in $R^5$ in the general formula (1) may be, for example, an alkyl group, a cycloalkyl group, an alkoxy group, a cycloalkoxy group, a heterocyclic group, an alkylidene group, a silyl group, an acyl group, an acyloxy group, a carboxy group, a cyano group, a nitro group, a hydroxy group, a mercapto group and an oxo group. Further, the number of carbon atoms contained in the substituent is preferably from 1 to 6, more preferably from 1 to 4, and still more preferably from 1 to 3.

The mechanism by which a by-product is generated during the distillation will be described with reference to the chemical formula shown below, regarding the case in which dimethyl phosphite ($(MeO)_2P(O)H$) is used as the phosphorus compound represented by the general formula (1). During the distillation, methanol is produced by the decomposition of dimethyl phosphite. The thus produced methanol and a tautomer ($(MeO)_2POH$) of dimethyl phosphite undergo a dehydration condensation reaction, to generate trimethyl phosphite as the by-product. In the present invention, it is thought that the dehydration condensation reaction can be inhibited by carrying out the distillation after the addition of the Lewis acid. It is noted, however, that the following mechanism is a presumption, and the present invention is in no way restricted to the following mechanism.

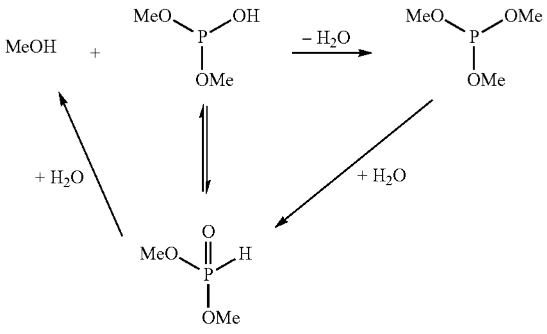

(Reuse Method)

According to the reuse method of the present invention, the phosphorus compound represented by the general formula (1) obtained by the purification method described above, can be used as a raw material substance for the synthesis of the alkenyl phosphorus compound represented by the general formula (2) by the hydrophosphorylation reaction. Since the content of the above-described by-product that acts as a catalyst poison is extremely low in the phosphorus compound represented by the general formula (1) obtained by the purification method described above, it is possible to allow the hydrophosphorylation reaction to efficiently proceed without inhibition, and to improve the yield of the alkenyl phosphorus compound.

EXAMPLES

The present invention will now be described in specific detail with reference to Examples and Comparative Examples. However, the present invention is in no way limited to these Examples.

Example 1

A quantity of 420 g of dimethyl phosphite was introduced into a 1 L autoclave reactor, cooled to 0° C., and then degassed under reduced pressure.

Subsequently, 7.25 mL of a THF solution (concentration: 0.25 mol/L) of $Ni(PMe_3)_4$ was added to the reactor, followed by stirring for 15 minutes. Acetylene was supplied into the reaction system at a supply pressure of 0.02 MPa, and the reaction was allowed to proceed until the absorption of acetylene was no longer observed, while maintaining the internal temperature and stirring conditions. The reaction was allowed to proceed for 9 hours, to obtain a reaction mixture containing dimethyl vinylphosphonate at a conversion rate of 71.3% and a selectivity of 91.2%.

Subsequently, zinc chloride as a Lewis acid was added to the resulting reaction mixture, in an amount of 4.0% by mass with respect to the total mass of the reaction mixture. The resulting mixture was then subjected to distillation under reduced pressure, under the conditions of a degree of pressure reduction of 1.0 kPa, to obtain the first distillate mainly containing dimethyl phosphite, the second distillate mainly containing dimethyl phosphite and dimethyl vinylphosphonate, and the third distillate mainly containing dimethyl vinylphosphonate. The content of dimethyl phosphite was 98.6% by mass and the content of trimethyl phosphite was below the detection limit (0.1% by mass or less), with respect to the total amount of the first distillate. Further, the content of dimethyl phosphite was 30% by mass and the content of dimethyl vinylphosphonate was 70% by mass, with respect to the total amount of dimethyl phosphite and dimethyl vinylphosphonate in the second distillate. The content of dimethyl phosphite was measured by GC-FID.

Subsequently, 4% zinc chloride was added to the resulting second distillate mixture, and the resultant was subjected to re-distillation under the conditions of a degree of pressure reduction of 1.0 kPa, to obtain the fourth distillate containing dimethyl phosphite, the fifth distillate mainly containing dimethyl phosphite and dimethyl vinylphosphonate, and the sixth distillate containing dimethyl vinylphosphonate. Dimethyl phosphite was recovered from the first and fourth distillates, by the distillation and re-distillation operations as described above. The thus recovered dimethyl phosphite can be used again, as a raw material substance for the synthesis of dimethyl vinylphosphonate. Further, dimethyl phosphite and dimethyl vinylphosphonate can be recovered by subjecting the fifth distillate to re-distillation. The dimethyl phosphite recovered from the fifth distillate can also be reused as a raw material substance for the synthesis of dimethyl vinylphosphonate.

Comparative Example 1

The distillation and re-distillation were carried out in the same manner as in Example 1, except that zinc chloride as a Lewis acid was not added to the above-described reaction mixture. The content of dimethyl phosphite was 95.3% by mass and the content of trimethyl phosphite was 3.3% by mass, with respect to the total amount of the first distillate.

A list of the results of Example 1 and Comparative Example 1 described above is shown in Table 1.

TABLE 1

| | Example 1 | Comparative Example 1 |
|---|---|---|
| Type of Lewis acid | ZnCl2 | — |
| Added amount of Lewis acid (% by mass) | 4.0 | — |

TABLE 1-continued

| | Example 1 | Comparative Example 1 |
|---|---|---|
| Yield with respect to the amount of mixture (% by mass) | | |
| First distillate | 24.6 | 18.3 |
| Second distillate | 11.5 | 15.3 |
| Third distillate | 51.8 | 50.3 |
| Residue | 10.8 | 8.5 |
| Content in first distillate (% by mass) | | |
| Phosphorus compound | 98.6 | 95.3 |
| Trimethyl phosphite | N.D. | 3.3 |

The invention claimed is:

1. A method of purifying a phosphorus compound, comprising the steps of:

obtaining a mixture of a phosphorus compound represented by the following general formula (1):

(1)

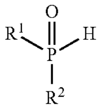

wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure, an alkenyl phosphorus compound represented by the following general formula (2):

(2)

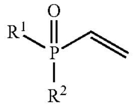

wherein, in general formula (2), the definitions of $R^1$ and $R^2$ are the same as those of $R^1$ and $R^2$ in the general formula (1) and a transition metal complex; and subjecting the mixture to distillation after adding a Lewis acid to the mixture, to obtain a first distillate containing the phosphorus compound represented by the general formula (1).

2. The purification method according to claim 1, wherein the content of a compound represented by the following general formula (3):

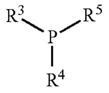

wherein, in general formula (3), the definitions of $R^3$ and $R^4$ are the same as those of $R^1$ and $R^2$ in the general formula (1); and $R^5$ represents a substituted or unsubstituted alkoxy group, a substituted or unsubstituted aryloxy group, or a substituted or unsubstituted allyl group, in the first distillate is 0.1% by mass or less with respect to the total mass of the first distillate.

3. The purification method according to claim 1, wherein the Lewis acid is a metal compound and/or a boron compound.

4. The purification method according to claim 3, wherein the metal compound is at least one selected from the group consisting of a zinc compound, an iron compound and an aluminum compound.

5. The purification method according to claim 4, wherein the zinc compound is zinc chloride.

6. The purification method according to claim 1, wherein each of $R^1$ and $R^2$ in the general formulae (1) and (2) independently represents a substituted or unsubstituted alkoxy group having from 1 to 10 carbon atoms, or a substituted or unsubstituted aryl group.

7. The purification method according to claim 1, wherein, in the general formula (3), each of $R^3$, $R^4$ and $R^5$ independently represents a substituted or unsubstituted alkoxy group having from 1 to 10 carbon atoms, a substituted or unsubstituted aryloxy group, or a substituted or unsubstituted allyl group.

8. The purification method according to claim 1, wherein the compound represented by the general formula (1) is dimethyl phosphite.

9. The purification method according to claim 1, wherein the compound represented by the general formula (2) is dimethyl vinylphosphonate.

10. The purification method according to claim 2, wherein the compound represented by the general formula (3) is trimethyl phosphite.

* * * * *